United States Patent

Domian et al.

[11] Patent Number: 4,560,854
[45] Date of Patent: Dec. 24, 1985

[54] ELECTRON BEAM WELDER CONTROL

[75] Inventors: Henry A. Domian; Charles M. Weber, both of Alliance, Ohio

[73] Assignee: The Babcock & Wilcox Company, New Orleans, La.

[21] Appl. No.: 566,120

[22] Filed: Dec. 27, 1983

[51] Int. Cl.$^4$ ............................................. B23K 15/00
[52] U.S. Cl. ...................... 219/121 EW; 219/121 EC; 219/121 EU
[58] Field of Search ............... 219/121 BH, 121 EU, 219/121 EV, 121 EW, 121 EC, 121 ED, 121 EM, 121 EB

[56] References Cited

U.S. PATENT DOCUMENTS 3,743,776 7/1973 Corcelle et al. ......... 219/121 EW X
4,400,609 8/1983 Pastushenko et al. ....... 219/121 EV

FOREIGN PATENT DOCUMENTS 0136586 7/1979 Fed. Rep. of Germany ...... 219/121 EW
0086689 6/1980 Japan ........................... 219/121 EW Primary Examiner—C. L. Albritton
Attorney, Agent, or Firm—Vytas R. Matas; Robert J. Edwards

[57] ABSTRACT

A control for an electron beam welder for maintaining the point of impact of an electron beam 16 on the intended weld line 6 between two weldments 2 and 4 and for monitoring or controlling the beam area wherein there is provided a strip of 8 and 10 material on each side of the weld line 6 emitting radiation predominantly of a specific wave length when impinged by the electromagnetic radiation produced by the electron beam 6, means 22 are provided for generating an output signal proportional to the difference in radiation emitted by the two strips of material 8 and 10 which is available for controlling the transverse positioning of the electron beam as required to maintain the point of impact along the intended weld line 6. Means 24 is provided for generating an output signal proportional to the sum of the radiation emitted by the two strips of material which is available for monitoring or controlling the area of the electron beam.

2 Claims, 3 Drawing Figures

ELECTRON BEAM WELDER CONTROL

BACKGROUND OF THE INVENTION

This invention relates to a control for an electron beam welder to maintain the point of impact of the electron beam in the intended weld line between two weldments and to maintain a predetermined beam area.

The electron beam must be in the area weld line with precision if advantage is to be taken of the electron beam. Such precision is not difficult to obtain if the weld line has a simple geometric shape; however, it becomes difficult to obtain if the weld line between weldments is irregular or because of the imprecision with which the weld line is known.

Several systems have been devised to maintain the electron beam in the intended weld line. A typical one, for example, is illustrated and described in U.S. Pat. No. 3,743,776 wherein back scattering of the electrons on opposite sides of the beam is used to maintain the electron beam in the intended weld line.

SUMMARY OF THE INVENTION

In contrast to such systems and in accordance with this invention there is derived from the electro magnetic radiation produced by the electron beam and impinging on each side of the weld line, a primary output signal proportional to the intensity of the radiation of a specific wave length within a specific narrow band of radiation and deriving a first output signal proportional to the difference between the primary output signals for controlling the transverse positioning of the electron beam to track the weld line.

Further, in accordance with this invention there is derived from the primary output signals, a second output signal proportional to the sum of the primary output signals for controlling the power density of the electron beam.

IN THE DRAWINGS

DETAILED DESCRIPTION

Figure 3:
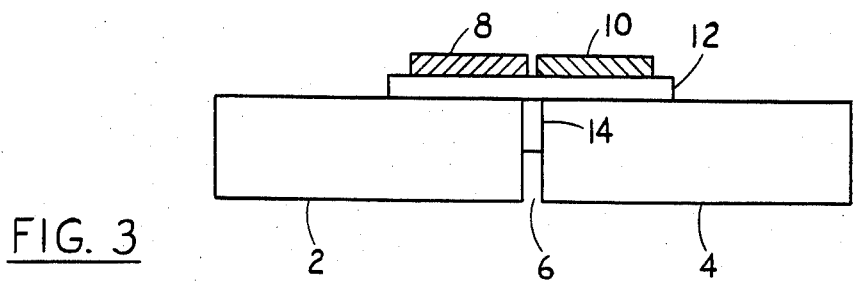
FIG. 3 is a fragmentary view of a modification of the apparatus illustrated in FIG. 1.

Referring now to the drawings wherein like reference characters designate like or corresponding parts throughout the views, there is shown weldments 2 and 4 to be welded together along a joint or weld line 6. Attached to the surface of the weldment 2 is a strip of material 8 tracking one side of the weld line 6 and a strip of material 10 attached to the surface of weldment 4 tracking the opposite side of the weld line 6. The materials 8 and 10 may be attached to the weldments, depending on the type of material, by painting, vapor deposition, plasma spraying, welding or by mechanically clamping to the weldments. FIG. 3 illustrates a modification wherein the materials 8 and 10 are attached to a plate 12 having a depending shim 14 which is inserted into the weld line 6.

The materials 8 and 10 can be any one of a class of materials of metallurgical compatability with weldments 2 and 4 and emitting radiation predominantly of a specific wave length when exposed to the radiation by an electron beam 16. During welding, the materials 8 and 10 emit radiation of different specific wave lenghts.

Carried by a conventional mechanism (not shown) for positioning the electron beam transversely of and longitudinally along the weld line 6 is a sensor 18 generating a first primary outputs signal proportional in magnitude to the radiation emitted from the material 8 and a sensor 20 generating a second primary output signal proportional in magnitude to the radiation emitted by the material 10.

Figure 1:
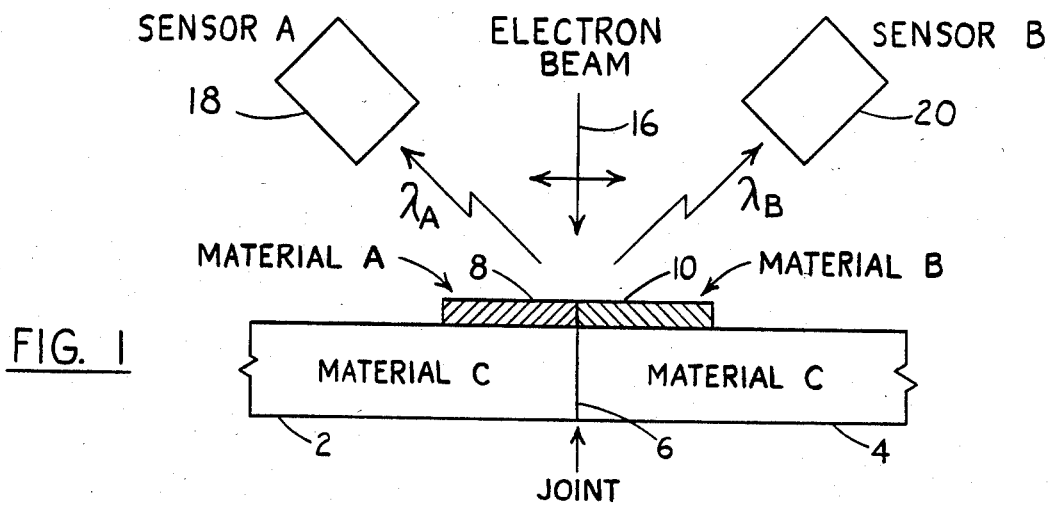
FIG. 1 is a schematic illustrating the principles of this invention.
Figure 2:
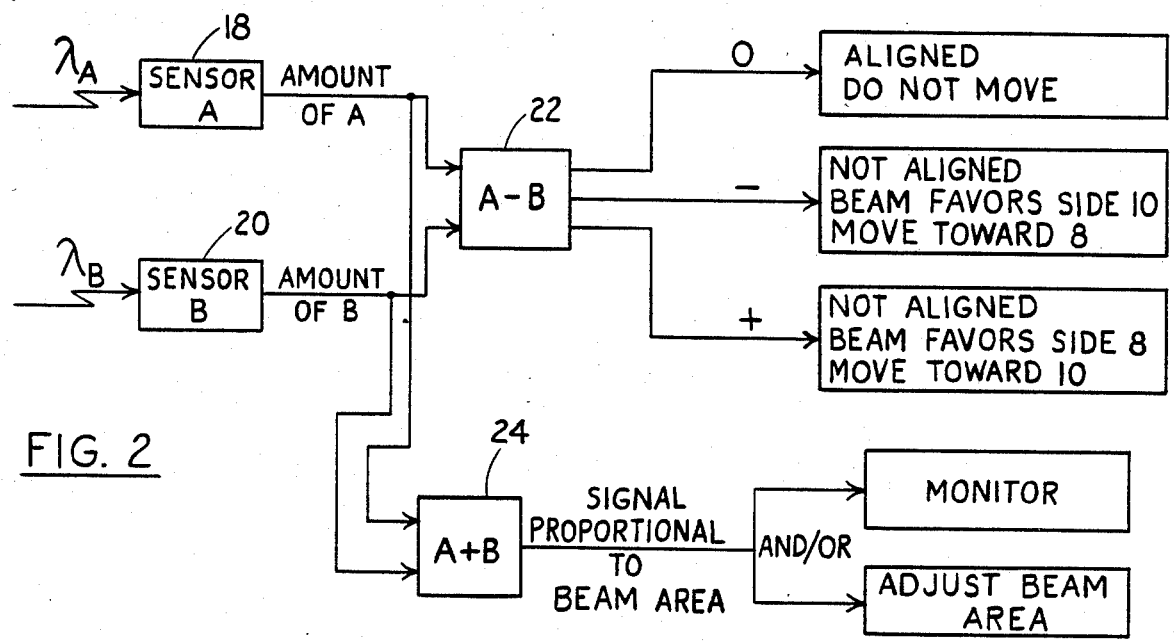
FIG. 2 is an elementary one-line logic diagram of the electrical circuits for deriving the desired output signals.

As schematically shown in FIG. 2, the primary output signal from sensor 20 is subtracted from the primary output signal from sensor 18 in a difference unit 22 to generate an output signal having a null or zero value when the radiation emitted from materials 8 and 10 are equal, a negative value when the radiation emitted from material 10 is greater than the radiation emitted from the material 8 and a positive value when the radiation emitted by material 8 is greater than the radiation emitted by material 10. Within the scope of those familiar with the art, there may be provided circuitry and mechanisms (not shown) responsive to the output signal from difference unit 22 to transversely position the electron beam 16 as it is longitudinally moved along the weldments to thereby maintain the output signal at a null or zero value when the electron beam is in alignment with the weld line.

Also, as shown schematically in FIG. 2, the primary output signals from sensors 18 and 20 may be added in a summing unit 24 to produce an output signal proportional to beam area and available for monitoring and/or control purposes.

We claim:

1. In an apparatus for maintaining the point of impact of an electron beam in the intended weld line between two weldments of the same material, a first means generating a first primary output signal predominantly of a specific wave length and proportional in magnitude to the radiation generated by the electron beam and impinging on one side of the weld line, a second means generating a second primary output signal predominantly of a specific wave length and proportional in magnitude to the radiation generated by the electron beam and impinging on the other side of the weld line, a difference unit responsive to said primary output signals generating an output signal available for the control of the transverse poisitioning of the electron beam to maintain the point of impact of the electron beam in the intended weld line between the two weldments, said first and second means each include a band of material affixed to a weldment and tracking the intended weld line exposed to the total radiation generated by the electron beam and emitting radiation predominantly of a specific wave length with the radiation emitted by the bands of material being predominantly of different specific wave lengths.

2. Apparatus as set forth in claim 1 wherein said first and second means include a band of material affixed to a plate having a depending shim for insertion in the weld line between the weldments.

* * * * *